United States Patent
Baset et al.

(10) Patent No.: US 9,104,455 B2
(45) Date of Patent: Aug. 11, 2015

(54) VIRTUAL MACHINE-TO-IMAGE AFFINITY ON A PHYSICAL SERVER

(71) Applicant: International Business Machines Corporation, Armonk, NY (US)

(72) Inventors: Salman A. Baset, New York, NY (US); Michael J. Fork, Gibsonburg, OH (US); Alexei A. Karve, Mohegan Lake, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 13/770,105

(22) Filed: Feb. 19, 2013

(65) Prior Publication Data

US 2014/0237479 A1    Aug. 21, 2014

(51) Int. Cl.
*G06F 9/46* (2006.01)
*G06F 9/455* (2006.01)
*G06F 9/50* (2006.01)

(52) U.S. Cl.
CPC ........ *G06F 9/45533* (2013.01); *G06F 9/45558* (2013.01); *G06F 9/5033* (2013.01); *G06F 2009/4557* (2013.01)

(58) Field of Classification Search
None
See application file for complete search history.

(56) References Cited

U.S. PATENT DOCUMENTS

| | | | |
|---|---|---|---|
| 8,011,010 B2 | 8/2011 | Michael et al. | |
| 8,122,282 B2 | 2/2012 | Betzler et al. | |
| 2008/0320594 A1 | 12/2008 | Jiang | |
| 2011/0154320 A1 | 6/2011 | Verma | |
| 2011/0214123 A1* | 9/2011 | Lublin et al. | 718/1 |
| 2011/0219372 A1* | 9/2011 | Agrawal et al. | 718/1 |
| 2011/0246627 A1 | 10/2011 | Kern | |
| 2011/0302578 A1 | 12/2011 | Isci et al. | |
| 2012/0084445 A1 | 4/2012 | Brock et al. | |

(Continued)

FOREIGN PATENT DOCUMENTS

EP    2043320 A1    4/2009

OTHER PUBLICATIONS

Zhang et al., Analysis of Virtual Machine Applied to Malware Detection System, IEEE International Symposium, May 16-17, 2009, pp. 290-294.

(Continued)

*Primary Examiner* — Lewis A Bullock, Jr.
*Assistant Examiner* — Jacob Dascomb
(74) *Attorney, Agent, or Firm* — Ryan, Mason & Lewis, LLP

(57) ABSTRACT

Techniques for improving virtual machine-to-image affinity on a physical server. A method includes identifying physical machines in a network as candidate source physical machines, wherein each candidate source physical machine stores a first virtual machine image and a set of additional virtual machine images, identifying physical machines in the network as candidate target physical machines, wherein each candidate target physical machine stores one of the additional virtual machine images, and selecting a virtual machine image from the set of additional virtual machine images and selecting a physical machine from the candidate target physical machines such that migrating the selected virtual machine image from a candidate source physical machine to the selected target physical machine results in a maximized image affinity per virtual machine in comparison to each image migration scenarios for the set of additional virtual machine images.

15 Claims, 3 Drawing Sheets

(56) References Cited

U.S. PATENT DOCUMENTS

| | | | |
|---|---|---|---|
| 2012/0089981 A1* | 4/2012 | Tripathi | 718/1 |
| 2012/0096472 A1 | 4/2012 | Maruyama | |
| 2012/0144489 A1 | 6/2012 | Jarrett et al. | |
| 2012/0272244 A1* | 10/2012 | Bozek et al. | 718/1 |
| 2013/0047153 A1* | 2/2013 | Emaru | 718/1 |

OTHER PUBLICATIONS

IP.COM et al., Method and System to Represent Instances of Images Installed Virtual System as an Instance Image, IPCOM000215985D, Mar. 15, 2012.

Akamai Technologies, http://en.wikipedia.orgiwiki/Akamai_Technologies, downloaded Jan. 21, 2013, pp. 1-8.

* cited by examiner

VIRTUAL MACHINE-TO-IMAGE AFFINITY ON A PHYSICAL SERVER

FIELD OF THE INVENTION

Embodiments of the invention generally relate to information technology, and, more particularly, to virtual machine management.

BACKGROUND

A virtual machine (VM) typically includes an image and a disk. In cloud platforms, (VM) images are commonly stored on local disks of a physical server. Additionally, VM disks can be stored on a storage area network (SAN). When a VM provisioning request arrives, the image needs to be copied onto the local disk of the physical server before starting the VM. If the image already exists, the VM can be started on the physical server. But if no physical server having the image has the capacity to run the VM, the image needs to be copied to a new physical server, which increases the provisioning time. Accordingly, images need to be available on a physical server before the relevant VM can be started on that physical server. Also, the physical server or physical machine (PM) must have the capacity to launch a VM from its available images.

Each physical server local disk has limited storage capacity. If care is taken not to assign VM images to a particular physical server, that physical server may run under capacity. For example, a physical server local disk can only store ten images, but can run 30 VMs. If only ten VMs from ten distinct images are running on this physical server, and no more requests for those VMs arrive, then the physical server capacity of running 20 VMs is wasted.

Existing approaches for managing such components include storing VM images on remote disks and storing VM disks on local disks of a physical server. Such approaches, however, have several disadvantages. For instance, a complex solution is needed to stream VM images to disks, and such approaches provide no guarantee of running VMs of the same type on the same physical server.

Accordingly, a need exists for maximizing virtual machine-to-image affinity on a physical server.

SUMMARY

In one aspect of the present invention, techniques for improving virtual machine-to-image affinity on a physical server are provided. An exemplary computer-implemented method can include steps of identifying one or more physical machines in a network as a candidate source physical machine, wherein each candidate source physical machine stores a first virtual machine image and a set of one or more additional virtual machine images, identifying one or more physical machines in the network as a candidate target physical machine, wherein each candidate target physical machine stores one of the set of one or more additional virtual machine images, and selecting a virtual machine image from the set of one or more additional virtual machine images and selecting a physical machine from the one or more candidate target physical machines such that migrating the selected virtual machine image from a candidate source physical machine to the selected target physical machine results in a maximized image affinity per virtual machine in comparison to each image migration scenarios for the set of one or more additional virtual machine images.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
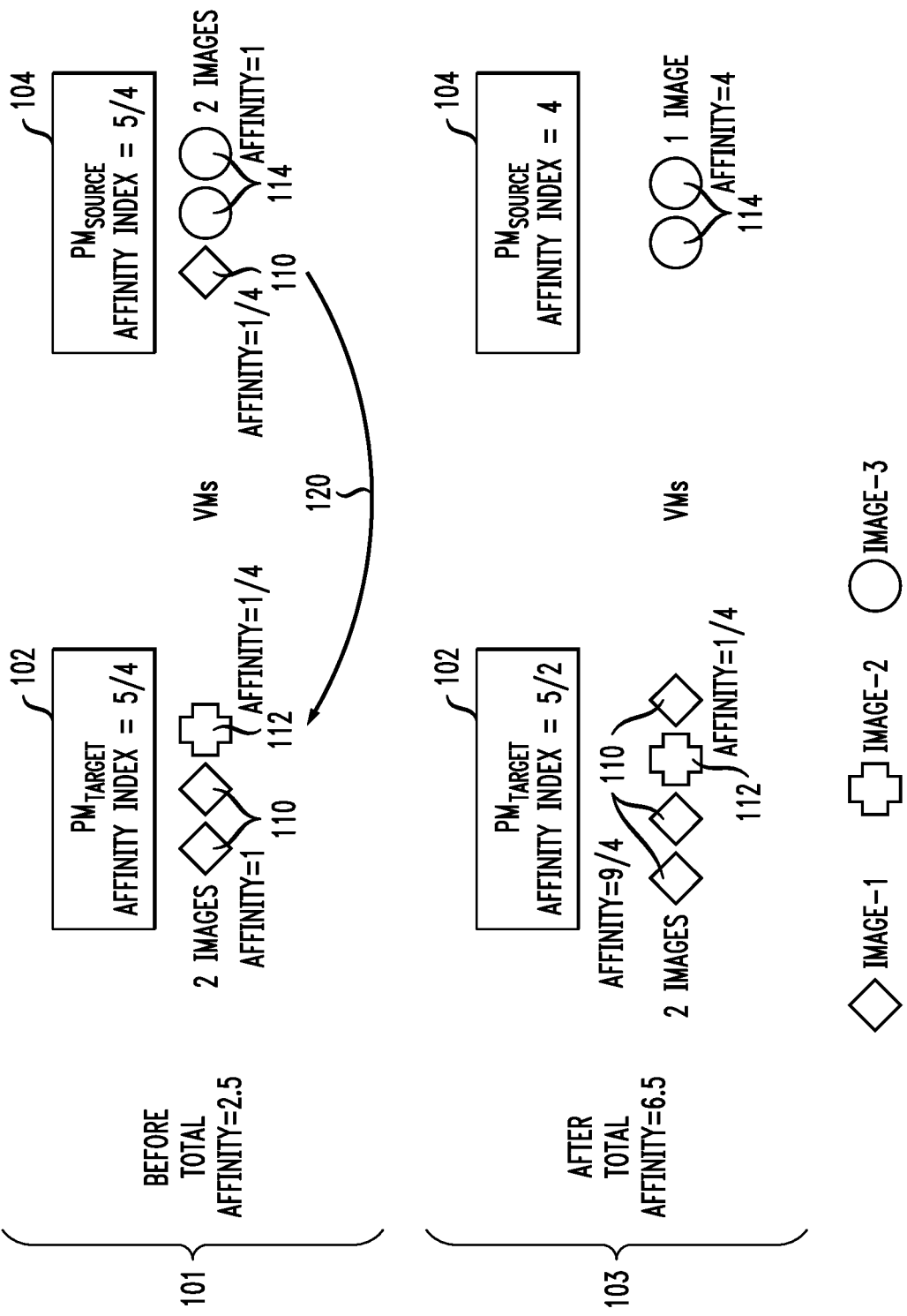
FIG. 1 is a diagram illustrating an example embodiment of the invention.

As described herein, an aspect of the present invention includes maximizing virtual machine-to-image affinity on a physical server. Affinity of a virtual machine (VM) is defined as the square of the number of VMs (also referred to herein as "instances") of the image used for the VM divided by the square of the total number of images in use on the physical server. Accordingly, VM affinity=(Number of VMs for Image)$^2$/(Number of utilized Images on Hypervisor)$^2$.

At least one embodiment of the invention also includes defining the affinity index of a physical server as the sum of the squares of the number of VMs for each image divided by the square of the number of images. Accordingly, Affinity Index(Hypervisor)=((Number of VMs for Image-1 on Hypervisor)$^2$+(Number of VMs for Image-2 on Hypervisor)$^2$+ . . . )/(Number of utilized Images on Hypervisor)$^2$. A goal includes maximizing the sum of the affinity indexes of all physical servers. The affinity index reflects image usage on the hypervisor, with higher usage representing a better affinity index. Note that this formula is only used as an example, and other formulas with a function other than squaring that favors the physical server with more VMs of a particular image would work.

Additionally, as noted, a typical provisioning process includes copying an image to the hypervisor and subsequently starting the relevant virtual machine. Further, as detailed herein, at least one embodiment includes reducing provisioning time without streaming by utilizing user-based hints.

As also detailed herein, a user can create VM images by taking a snapshot of a running VM, from which he or she can boot a new VM instance. To provision VMs from these images, the images will also have to be copied to a physical server over the data center network. Depending on the image size, such copying can potentially increase the provisioning time. Additionally, when a VM is migrated from one physical machine (PM) to the other, the image may also need to be copied if the image does not exist on the target VM, potentially increasing the live migration time.

An aspect of the invention includes improving VM-to-image affinity on a physical server both during provisioning and otherwise (for example, periodically). For example, at least one embodiment of the invention includes facilitating the ability to run an increasing number of VMs from the same image on the same physical server.

By way of example, consider the following example. A PM has three images, A, B, C, running ten VMs: A=5, B=3 and C=2. As such, image affinity per VM is $A=5^2/(5+3+2)^2$, $B=3^2/(5+3+2)^2$ and $C=2^2/(5+3+2)^2$. The affinity index for the PM is $(5^2+3^2+2^2)/(5+3+2)_2=0.38$. Improving or maximizing VM-to-image affinity can lead to decreasing provisioning time, improving the over-commit ratio (for example, by leveraging memory compression across identical VMs), and enable the use of a smaller-sized local disk for storing images. Conversely, storing VM image remotely can lead to an increase in provisioning time, a decrease in performance, and a need to increase the capacity of SAN network, which can be costly. Additional resource requirements for each VM, such as central processing unit (CPU) and memory, place additional constraints on the placement of VMs on the physical machine. When choosing a target PM, these resource requirements are referred to herein as placement constraints.

Accordingly, as noted, at least one embodiment of the invention includes maximizing VM-to-image affinity on a physical server. Such an embodiment can include implementing a periodic decision tree to calculate image affinity per VM on a PM, and identifying an image X such that moving the image X from a source PM to a target PM will satisfy the placement constraints and choosing a target such that image affinity on the target PM increases.

Also, at least one embodiment of the invention includes implementing a provisioning decision tree. In such an embodiment, a provisioning decision tree can include options to handle the X image as follows. For example, at least one embodiment of the invention includes copying the image to a PM that has capacity, and launching the VM (if image X is not available on any PM). Also, the VM can be launched if image X is available on a PM that has capacity and meets the placement constraints.

Additionally, at least one embodiment of the invention can include denoting a PM as a source candidate if an image X is located on a PM that is limited by a non-disk capacity constraint, providing a list (X") denoting images other than image X located on a local disk (for each PM source candidate), and identifying PM target candidates that only contain any image in list (X") and have available non-disk capacity. Such an embodiment further includes selecting a image candidate from list (X") and a PM target from PM target candidates such that migrating the X" candidate to the PM target results in maximizing image affinity index for PMs across all possible image migration scenarios in list (X")). This can be performed, for each image from X" and for each target from the PM target candidates, by computing the affinity index (as per the formula detailed herein) if the image were moved to the target, and ultimately selecting the PM that provides the maximum image affinity index.

Further, at least one embodiment of the invention also includes initiating the migration from a PM source candidate to the selected PM target, and launching the VM on the PM from which a migration is initiated. Additionally, in at least one embodiment of the invention, the source and the target PM can be selected to minimize the migration time. Also, at least one embodiment of the invention includes creating or starting a new PM if no current PM in list (X") has the requisite capacity. This PM can be in a spare pool of machines that are maintained in a powered-off state to reduce power usage and are turned on in response to increased demand of resources.

FIG. 1 is a diagram illustrating an example embodiment of the invention. The rhombus 110 represents Image-1, the cross 112 represents Image-2 and the circle 114 represents Image-3. By way of illustration, FIG. 1 depicts a "before" representation 101 and an "after" representation 103. In the "before" representation 101, FIG. 1 depicts a $PM_{target}$ 102 with two VMs 110 created for Image-1, and one VM 112 for Image-1, as well as a $PM_{source}$ 104 with one VM 110 of Image-1 and two VMs 114 of Image-3.

Accordingly, the affinity for VMs 110 on $PM_{target}$ 102 is $2^2/2^2=1$, and the affinity for VM 112 on $PM_{target}$ 102 is $1^2/2^2=1/4$. The affinity index for $PM_{target}$ 102 is $(2^2+1^2)/2^2=5/4$. The affinity for VM 110 on $PM_{source}$ 104 is $1^2/2^2=1/4$, and the affinity for VMs 114 on $PM_{source}$ 104 is $2^2/2^2=1$. The affinity index for $PM_{source}$ 104 is $(1^2+2^2)/2^2=5/4$. The total affinity index for the two PMs (102 and 104) is $5/4+5/4=10/4=2.5$ in the "before" representation 101.

Further, as illustrated in FIG. 1, the single VM instance of Image-1 is moved from $PM_{source}$ 104 to $PM_{target}$ 102, as represented by arrow 120, because $PM_{target}$ 102 already contains VM instances for Image-1. In the "after" representation 103, FIG. 1 depicts $PM_{target}$ 102 with three VMs 110 of Image-1 and one VM 112 of Image-2, as well as $PM_{source}$ 104 with two VMs 114 of Image-3. The affinity for VMs 110 on $PM_{target}$ 102 is changed to $3^2/2^2$ and the affinity for VM 112 on $PM_{target}$ 102 is $1^2/2^2$. The affinity index for $PM_{target}$ 102 is $(3^2+1^2)/2^2=10/4=5/2$. VM 110 is no longer present on $PM_{source}$ 104. The affinity for VMs 114 on $PM_{source}$ 104 is $2^2/1^2=4$. The affinity index for $PM_{source}$ 104 is $(2^2)/1^2=4/1=4$. The total affinity index for the two PMs (102 and 104) is $5/2+4=6.5$ in the "after" representation.

In accordance with the depiction of FIG. 1, and as detailed herein, at least one embodiment of the invention includes calculating image affinity per VM on a PM. Additionally, an image X is identified, such that moving the image X from $PM_{source}$ 104 to $PM_{target}$ 102 will satisfy one or more placement constraints and ensure that total image affinity increases. As detailed above, in the "before" representation 101, the total affinity index was 2.5, and the affinity index increased to 6.5 in the after representation 103.

As also detailed herein, if image X is not available on any PM, at least one to embodiment of the invention includes copying the image (X) to a PM that has sufficient capacity, and launching the VM. If image X is available on a PM that has sufficient capacity and meets one or more placement constraints, the VM can be launched on that PM.

Additionally, as also noted above, if image X is available on PMs that are limited by a non-disk capacity constraint (resources such as CPU, memory, etc.), those PMs can be denoted as $PM_{sourcecandidates}$. For each $PM_{sourcecandidate}$, List (X") denotes images on the $PM_{sourcecandidate}$'s local disk other than X. Further, at least one embodiment of the invention includes identifying $PM_{targetcandidates}$ that only contain an image in list (X") and have available non-disk capacity. Accordingly, an identified image $X"_{candidate}$ is selected from List (X"), and a $PM_{target}$ is selected from $PM_{targetcandidates}$ such that migrating $X"_{candidate}$ to $PM_{target}$ results in maximizing image affinity per VM across all possible image migration scenarios in List (X"). Additionally, as described herein, a migration from a $PM_{sourcecandidate}$ to a $PM_{target}$ can be initiated, and the VM on the PM from which a migration is initiated can be launched.

Figure 2:
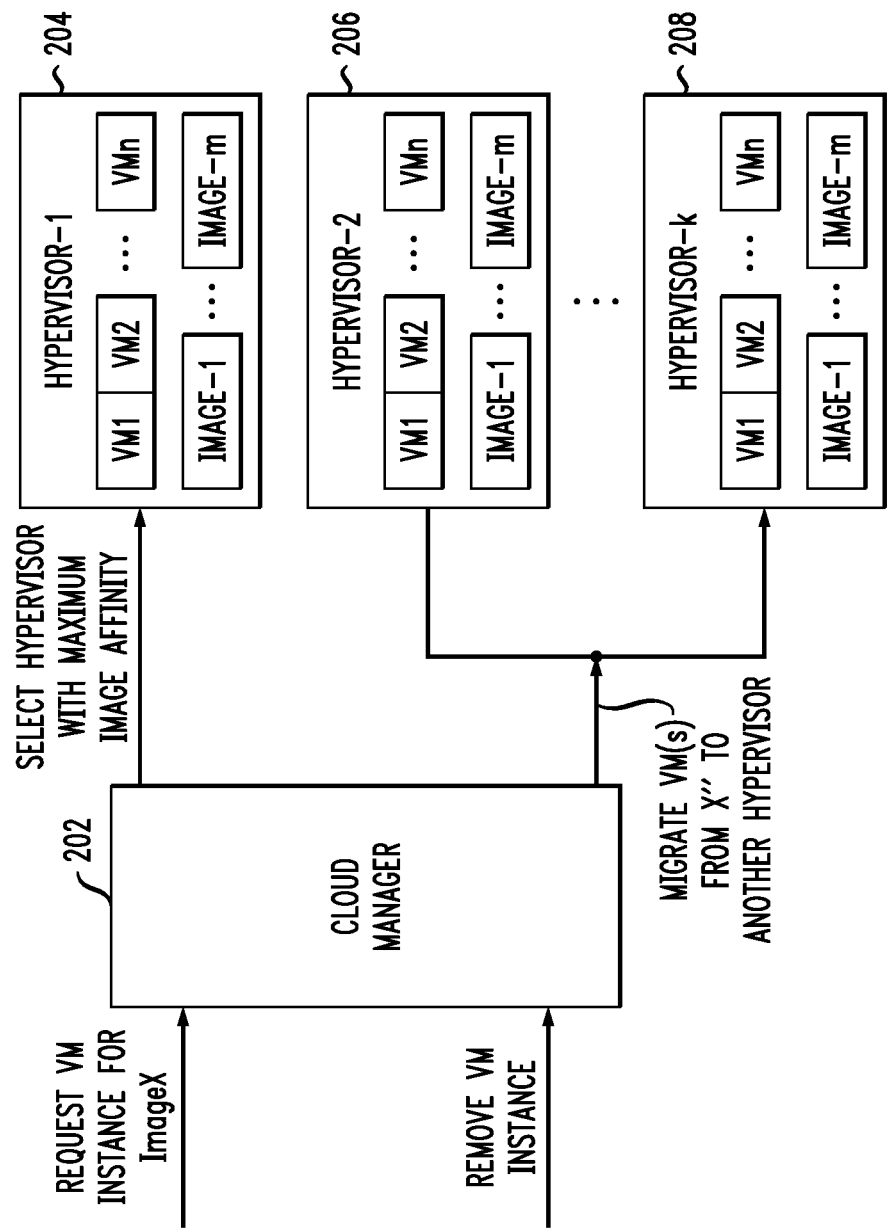
FIG. 2 is a block diagram illustrating an example embodiment, according to an aspect of the invention.

FIG. 2 is a block diagram illustrating an example embodiment, according to an aspect of the invention. By way of illustration, FIG. 2 depicts a cloud manager 202, hypervisor-1 (204), hypervisor-2 (206) and hypervisor-k (208), wherein each hypervisor includes a number of VMs and images.

As illustrated in FIG. 2, a request for a new VM instance for ImageX is received by cloud manager 202. The cloud manager 202 determines the hypervisor with the highest affinity that satisfies the placement constraints, and if none of the hypervisors can accommodate the non-disk placement constraints, a migration of another VM is performed to make room for the incoming request, and once the migration is completed, the new VM instance can be started. When the cloud manager 202 receives a request to delete a VM instance, a migration of VM instances can be initiated. This migration can be performed by the cloud manager 202 when a request arrives, or the migration can be performed periodically. Additionally, the migration results in an increase of the total affinity index of the hypervisors.

Figure 3:
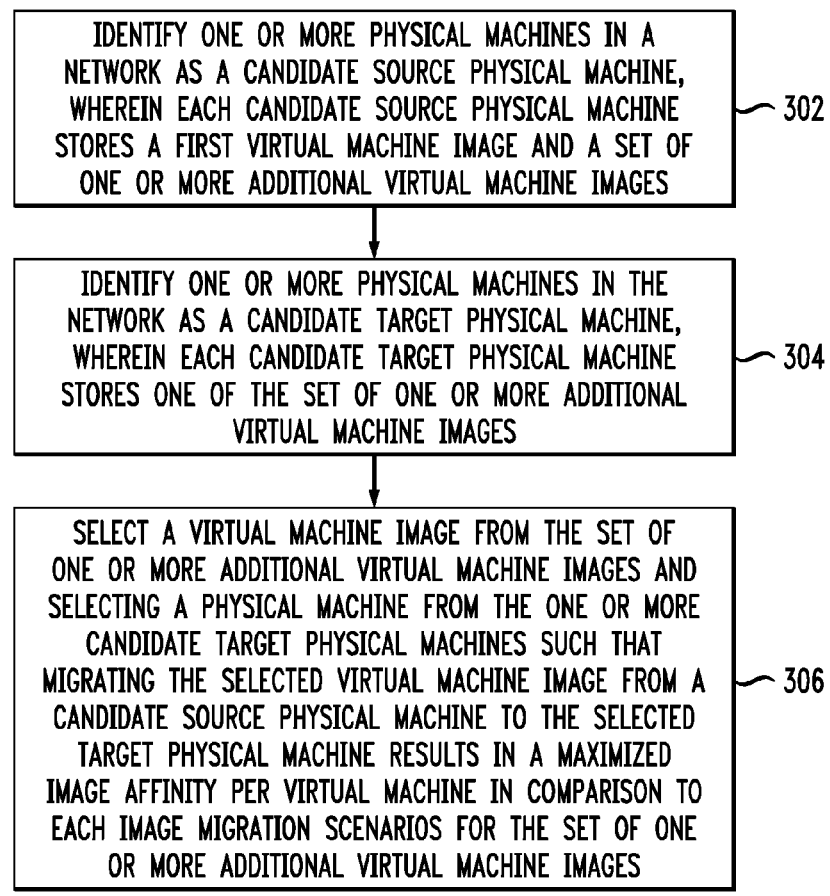
FIG. 3 is a flow diagram illustrating techniques according to an embodiment of the invention.

FIG. 3 is a flow diagram illustrating techniques according to an embodiment of the invention. Step 302 includes identifying one or more physical machines in a network as a candidate source physical machine, wherein each candidate source physical machine stores a first virtual machine image and a set of one or more additional virtual machine images. In at least one embodiment of the invention, each candidate source physical machine is limited by a non-storage capacity constraint.

Step 304 includes identifying one or more physical machines in the network as a candidate target physical machine, wherein each candidate target physical machine stores one of the set of one or more additional virtual machine images. In at least one embodiment of the invention, each candidate target physical machine has available non-disk capacity.

Step 306 includes selecting a virtual machine image from the set of one or more additional virtual machine images and selecting a physical machine from the one or more candidate target physical machines such that migrating the selected virtual machine image from a candidate source physical machine to the selected target physical machine results in a maximized image affinity per virtual machine in comparison to each image migration scenario for the set of one or more additional virtual machine images. By way of example, a maximized image affinity per virtual machine on a source physical machine can be specified as a requirement for a new virtual machine to be placed on a same host as an existing virtual machine, and/or a source physical machine can be a physical machine that contains a virtual machine image for which a new virtual machine instance is being requested when no hosts have non-disk capacity available.

The techniques depicted in FIG. 3 can also include initiating a migration of the selected image from a candidate source physical machine to the selected target physical machine, as well as launching the virtual machine corresponding to the selected image on the candidate source physical machine from which the migration is initiated. Additionally, at least one embodiment of the invention includes selecting a source physical machine from the one or more candidate source physical machines and the target physical machine based on one or more policies. Such policies can include, for example, minimization of migration time, maximization of resource usage (so that unused PMs can be turned off and returned to a spare pool), and distribution of resource usage (so that PMs do not need over-allocation).

Further, the techniques depicted in FIG. 3 can additionally include bringing a new physical machine online if no candidate source physical machine has a requisite capacity. Also, as described herein, at least one embodiment of the invention includes carrying out migration of a selected virtual machine from a physical machine when no physical machine in the network is available for placement and/or migration of the selected image. The selected virtual machine can be selected, for example, based on use of a proximity parameter, which can include selecting a virtual machine running on a physical machine that has the selected image available on one or more additional physical machines in a same rack or zone or region that groups the PMs by network bandwidth or cost. The selected VM can also trigger additional VM migrations across PMs. Accordingly, the selected virtual machine can be selected based on a corresponding number of levels of migration that can be triggered by a provisioning request in connection with migration of the selected virtual machine. Levels of migration include the number of transfers of virtual machine instances across multiple physical machines to make room for an incoming virtual machine instance.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 4:
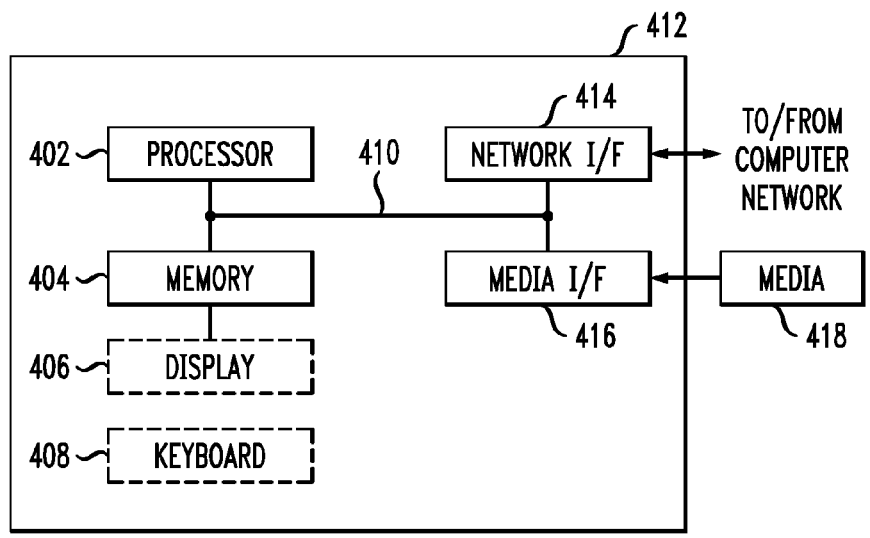
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, maximizing virtual machine-to-image affinity on a physical server.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
identifying one or more physical machines in a network as a candidate source physical machine, wherein each candidate source physical machine stores a set of two or more different virtual machine images;
identifying one or more physical machines in the network as a candidate target physical machine, wherein each candidate target physical machine stores a virtual machine image that corresponds to at least one of the different virtual machine images of the candidate source physical machine, and includes available storage capacity for additional virtual machine images; and
selecting a virtual machine image from the set of two or more different virtual machine images and selecting a target physical machine from the one or more candidate target physical machines to which the selected virtual machine image is to be migrated from a selected source physical machine;
wherein selecting the target physical machine to receive the migrated selected virtual machine image comprises:
calculating, on each candidate target physical machine, an affinity index value for each virtual machine image type $t_1, \ldots t_m$, wherein m is a natural number greater than zero, and wherein the calculation includes determining the number of instances, $n_{t1}, \ldots ._m$, for each image type on the candidate target physical machine, wherein n is a natural number greater than zero, resulting in affinity index values per respective image types given by:

$$\frac{n_{t1}^2}{(m)^2}, \ldots \frac{n_{tm}^2}{(m)^2};$$

calculating an affinity index value for the identified one or more candidate target physical machines based on:

$$\frac{(n_{t1}^2 + \ldots n_{tm}^2)}{(m)^2};$$

and selecting the target physical machine to receive the migrated selected virtual machine image that has an increased affinity index when the selected virtual machine image is migrated thereto, such that migrating the selected virtual machine image from the selected source physical machine to the selected target physical machine results in a maximized image affinity per virtual machine in comparison to each image migration scenario for the selected virtual machine image; and wherein at least one of the steps is carried out by a computer device.

2. The method of claim 1, wherein each candidate source physical machine is limited by a non-storage capacity constraint.

3. The method of claim 1, wherein each candidate target physical machine has available non-disk capacity.

4. The method of claim 1, comprising:
initiating a migration of the selected virtual machine image from a candidate source physical machine to the selected target physical machine.

5. The method of claim 4, comprising:
launching a virtual machine corresponding to the selected virtual machine image on the candidate source physical machine from which the migration is initiated.

6. The method of claim 1, comprising:
selecting the source physical machine from the one or more candidate source physical machines and the target physical machine based on one or more parameters.

7. The method of claim 6, wherein the one or more parameters comprise minimization of migration time.

8. The method of claim 1, comprising:
bringing a new physical machine online if no candidate source physical machine has a requisite capacity.

9. The method of claim 1, comprising:
migrating a selected virtual machine from a physical machine when no physical machine in the network is available for placement and/or migration of the selected virtual machine image.

10. The method of claim 9, wherein the selected virtual machine is selected based on use of a proximity parameter.

11. The method of claim 10, wherein said use of a proximity parameter comprises selecting a virtual machine running on a physical machine that has the selected virtual machine image available on one or more additional physical machines in a same rack, zone and/or region that is grouped by network bandwidth capacity.

12. The method of claim 9, wherein the selected virtual machine is selected based on a corresponding number of levels of migration that can be triggered by a provisioning request in connection with migration of the selected virtual machine.

13. The method of claim 12, wherein said levels of migration comprise a number of transfers of virtual machine instances across multiple physical machines to make room for an incoming virtual machine instance.

14. The method of claim 1, wherein a maximized image affinity per virtual machine on a source physical machine is specified as a requirement for a new virtual machine to be placed on a same host as an existing virtual machine.

15. The method of claim 1, wherein a source physical machine is a physical machine that contains a virtual machine image for which a new virtual machine instance is being requested when no hosts have non-disk capacity available.

* * * * *